(12) United States Patent
Jesionowski et al.

(10) Patent No.: US 11,798,591 B2
(45) Date of Patent: Oct. 24, 2023

(54) LOCKABLE AIR GAP DEEP CELLS IN A TAPE LIBRARY

(71) Applicant: International Business Machines Corporation, Armonk, NY (US)

(72) Inventors: Leonard G. Jesionowski, Tucson, AZ (US); Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 17/481,347

(22) Filed: Sep. 22, 2021

(65) Prior Publication Data

US 2023/0094223 A1    Mar. 30, 2023

(51) Int. Cl.
*G11B 15/68* (2006.01)
*G11B 15/675* (2006.01)
*G11B 23/023* (2006.01)
*G11B 23/02* (2006.01)

(52) U.S. Cl.
CPC ........ *G11B 15/684* (2013.01); *G11B 15/67502* (2013.01); *G11B 15/6751* (2013.01); *G11B 15/688* (2013.01); *G11B 23/0236* (2013.01); *G11B 23/02* (2013.01)

(58) Field of Classification Search
None
See application file for complete search history.

(56) References Cited

U.S. PATENT DOCUMENTS

| | | | |
|---|---|---|---|
| 4,924,683 A | 5/1990 | Derman | |
| 6,905,698 B1 | 6/2005 | Alderoft et al. | |
| 6,936,795 B1 | 8/2005 | Moon et al. | |
| 7,477,478 B2 | 1/2009 | Nave et al. | |
| 8,082,058 B2 | 12/2011 | Thompson et al. | |
| 8,675,302 B2 | 3/2014 | Hashimoto | |

(Continued)

FOREIGN PATENT DOCUMENTS

| | | |
|---|---|---|
| CN | 1741160 A | 3/2006 |
| CN | 101197170 B | 9/2010 |
| CN | 101395667 B | 6/2011 |
| CN | 102132344 B | 5/2014 |
| DE | 102008010147 A1 | 9/2009 |

(Continued)

OTHER PUBLICATIONS

"Immunize Data from Ransomware with Scalar Active Vault Technology", Quantum, Technology Brief, TB00054A-v01, Jan. 2020, <https://cdn.allbound.com/iq-ab/2020/02/Active-Vault-Tech-Brief-TB00054A.pdf>, 8 pages.

(Continued)

*Primary Examiner* — Craig A. Renner
(74) *Attorney, Agent, or Firm* — Gilbert Harmon, Jr.

(57) ABSTRACT

A deep slot cell configured to house a plurality of tape cartridges. The deep slot cell includes a front side of the deep slot cell configured to allow insertion and removal of a locking tape cartridge of the plurality of tape cartridges by a robotic mechanism. The deep slot cell includes a depth side of the deep slot cell configured with an opening to engage a locking mechanism that prevents a biasing spring mechanism of the deep slot cell from advancing a rearmost tape cartridge of the plurality of tape cartridges forward toward the front side of the deep slot cell. The deep slot cell includes a front air gap at the front side of the deep slot cell that prevents the robotic mechanism from reaching a front-most tape cartridge of the plurality of tape cartridges after the robotic mechanism removes the locking tape cartridge from the deep slot cell.

25 Claims, 9 Drawing Sheets

(56) References Cited

U.S. PATENT DOCUMENTS

| | | | | |
|---|---|---|---|---|
| 8,929,023 | B1* | 1/2015 | Jesionowski et al. | G11B 27/002 360/92.1 |
| 9,025,275 | B1 | 5/2015 | Manes et al. | |
| 10,026,445 | B1* | 7/2018 | Gale et al. ............. | G11B 23/28 |
| 2009/0040653 | A1* | 2/2009 | Green et al. ......... | G11B 17/225 242/327 |
| 2011/0194386 | A1* | 8/2011 | Ishii .................. | G11B 15/6885 369/30.43 |
| 2022/0254380 | A1* | 8/2022 | Baker et al. ......... | G11B 23/023 |

FOREIGN PATENT DOCUMENTS

| | | | |
|---|---|---|---|
| DE | 102012201842 A1* | 8/2012 | |
| EP | 1383121 B1 | 5/2010 | |
| JP | 2013033571 A | 2/2013 | |
| JP | 2015084267 A * | 4/2015 | |
| WO | 2013114611 A1* | 8/2013 | |

OTHER PUBLICATIONS

International Search Report and Written Opinion, International Application No. PCT/IB2022/056206, International Filing Date Jul. 5, 2022.

* cited by examiner

LOCKABLE AIR GAP DEEP CELLS IN A TAPE LIBRARY

BACKGROUND OF THE INVENTION

The present invention relates generally to tape library data protection, and more particularly to tape library deep cell storage technology.

Tape cartridges have traditionally been used for video archives, back-up files, replicas for disaster recovery and retention of information on premise, but the industry is also expanding to off-premises applications in the cloud.

Tape cartridges are usually stored in huge enterprise tape libraries. In order to preserve these tape cartridges, high density tape library frames containing high density (HD) tape cartridge storage slots are utilized, where a single HD tape cartridge storage slot can hold up to five tape cartridges stacked in a row, instead of a single tape to a storage slot. Each tape cartridge in the HD tape cartridge storage slot is referenced with a tier number indicating a position within the HD tape cartridge storage slot, where the tier number increases in a depth direction as more tape cartridges are added to the HD tape cartridge storage slot.

Presently, data security solutions are in high demand. With hackers and cyber-criminals abounding, data security is of paramount importance to clients. Clients need a secure way of storing data that addresses and mitigates concerns related to data theft or misuse. Leveraging tape cartridges as a long-term storage medium is generally viewed as physically secure because there is a physical "air gap". Each tape cartridge that contains client data cannot be accessed unless the tape cartridge is loaded into a tape drive where the data can be read/written. This physical barrier or "air gap" is a major selling point for storing data on tape cartridges when considered against storing data on flash or hard disks that are typically connected to a network, and available "online" where it may be subject to hackers or cyber-criminal activity.

SUMMARY

Aspects of an embodiment of the present invention disclose an apparatus, a method, and a computer system for data storage protection.

Aspects of an embodiment of the present invention disclose an apparatus for data storage protection. The apparatus includes a data storage library including a deep slot cell configured to house a plurality of tape cartridges, wherein the deep slot cell comprises a front side of the deep slot cell configured to allow insertion and removal of a locking tape cartridge of the plurality of tape cartridges by a robotic mechanism. The deep slot cell further comprises a depth side of the deep slot cell configured with an opening to engage a locking mechanism that prevents a biasing spring mechanism of the deep slot cell from automatically advancing a rear-most tape cartridge of the plurality of tape cartridges forward toward the front side of the deep slot cell. The deep slot cell further comprises a front air gap at the front side of the deep slot cell that prevents the robotic mechanism from reaching a front-most tape cartridge of the plurality of tape cartridges after the robotic mechanism removes the locking tape cartridge from the deep slot cell.

Aspects of an embodiment of the present invention disclose an apparatus for data storage protection. The apparatus includes a data storage library including a deep slot cell configured to house a plurality of tape cartridges, wherein the deep slot cell comprises a front side of the deep slot cell configured to allow insertion and removal of a plurality of tape cartridges by a robotic mechanism. The deep slot cell further comprises the front side of the deep slot cell configured to allow insertion and removal of a locking tape cartridge of the plurality of tape cartridges by the robotic mechanism, wherein the locking tape cartridge being inserted by the gripper assembly into the front side of the deep slot cell pushes each of the plurality of tape cartridges rearward of the locking tape cartridge toward a depth side of the deep slot cell. The deep slot cell further comprises the depth side of the deep slot cell configured with an opening to engage the locking mechanism, wherein the engaged locking mechanism renders a biasing spring mechanism of the deep slot cell inoperable. The deep slot cell further comprises a front air gap at the front side of the deep slot cell that prevents the robotic mechanism from reaching a front-most tape cartridge of the plurality of tape cartridges after the gripper assembly removes the locking tape cartridge from the deep slot cell. The deep slot cell further comprises the locking mechanism configured to be disengaged from the housing of the deep slot cell at the depth side of the deep slot cell manually via user interaction, where manually disengaging the locking mechanism from the housing permits a spring mechanism to advance the plurality of tape cartridges.

Aspects of an embodiment of the present invention disclose an apparatus for data storage protection. The apparatus includes a data storage library including a deep slot cell configured to house a plurality of tape cartridges, wherein the deep slot cell comprises a front side of the deep slot cell configured to allow insertion and removal of a plurality of tape cartridges by a robotic mechanism, wherein the robotic mechanism is a gripper assembly integrated within the data storage library. The deep slot cell further comprises the front side of the deep slot cell configured to allow insertion and removal of a locking tape cartridge of the plurality of tape cartridges by the robotic mechanism, wherein the locking tape cartridge being inserted by the gripper assembly into the front side of the deep slot cell pushes each of the plurality of tape cartridges rearward of the locking tape cartridge toward a depth side of the deep slot cell far enough to engage a locking mechanism with a portion of a housing of the deep slot cell after passing through an opening configured with the depth side of the deep slot cell. The deep slot cell further comprises the depth side of the deep slot cell configured with the opening to engage the locking mechanism, wherein the engaged locking mechanism prevents a biasing spring mechanism of the deep slot cell from automatically advancing a rear-most tape cartridge of the plurality of tape cartridges forward toward the front side of the deep slot cell. The deep slot cell further comprises a front air gap at the front side of the deep slot cell that prevents the robotic mechanism from reaching a front-most tape cartridge of the plurality of tape cartridges after the gripper assembly removes the locking tape cartridge from the deep slot cell. The deep slot cell further comprises the locking mechanism configured to be disengaged from the housing of the deep slot cell at the depth side of the deep slot cell manually via user interaction, wherein the locking mechanism is a depressible locking mechanism.

Aspects of an embodiment of the present invention disclose a method for data storage protection. The method includes modifying a deep slot cell configured to house a plurality of tape cartridges, wherein modifying the deep slot cell comprises integrating a locking mechanism with a biasing spring mechanism of a deep slot cell. The method further includes creating an opening at the depth side of the deep slot cell to engage the locking mechanism. The method further includes creating a front air gap at a front side of the deep slot cell that prevents a robotic mechanism from reaching a front-most tape cartridge of the plurality of tape cartridges by loading and removing a locking tape cartridge.

Aspects of an embodiment of the present invention disclose a computer system for data storage protection. The computer system includes program instructions to modify a deep slot cell configured to house a plurality of tape cartridges, wherein the program instructions to modify the deep slot cell further comprise program instructions to integrate a locking mechanism with a biasing spring mechanism of a deep slot cell. The computer system further includes program instructions to create an opening at the depth side of the deep slot cell to engage the locking mechanism. The computer system further includes program instructions to create a front air gap at a front side of the deep slot cell that prevents a robotic mechanism from reaching a front-most tape cartridge of the plurality of tape cartridges by loading and removing a locking tape cartridge.

DETAILED DESCRIPTION

Figure 1:
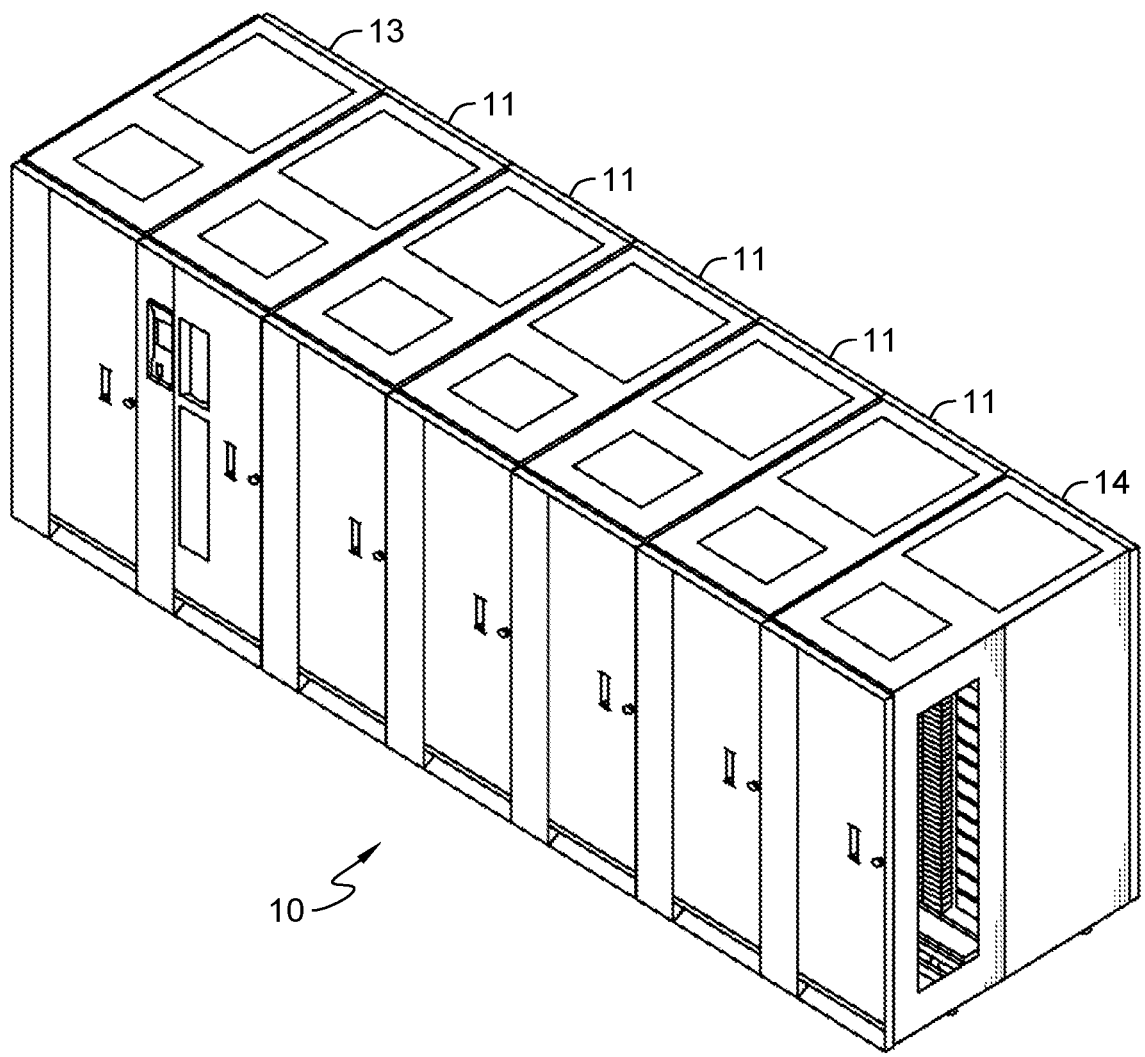
FIG. 1 illustrates a perspective view of a data storage library, in accordance with an embodiment of the present invention.

Embodiments of the present invention recognize that in a tape library storage management environment, even where data is stored on tape cartridges in an automated tape library where a physical "air gap" barrier exists, there may still be data security concerns for a client. For example, a potential concern may be that a malicious hacker could hack into both the tape library as well as a host server and cause a tape cartridge to be mounted into a tape drive where the data on the tape cartridge could be at risk.

Embodiments of the present invention recognize that a known solution for preventing this security exposure is to remove tape cartridges from an automated tape library and lock the tape cartridges in a vault that is completely disconnected from any network. However, this still presents a security exposure, as the tape cartridges can be lost or stolen after removal from the tape library in transit to the vault.

Embodiments of the present invention recognize that there is a security benefit in retaining this "air gap". Embodiments of the present invention recognize a need for a mechanism that enables data to be stored on tape cartridges within an automated tape library more securely, while preserving the benefits of the "air gap".

Embodiments of the present invention provide the capability to take advantage of an inherent feature that exists in a tape library that includes deep cell technology. In tape libraries that include deep cell technology, tape cartridges are stored one behind each other in a tiered lateral layout within deep slot cells. When stored in this way, tape library robotics can only access the tape cartridges located at a frontmost position of a deep slot cell.

Embodiments of the present invention provide the capability to create lockable "air gapped" deep slot cells by modifying a rear stop position of tape library data storage cells (i.e., deep slot cells, high-density (HD) storage slots, etc.) to a slightly deeper rear stop position than what is currently used. Embodiments of the present invention provide the capability for tape cartridges being inserted into a lockable deep slot storge cell by tape library robotics, such as a tape gripper using a "palm", would stop in a position that is out of reach of the tape gripper "fingers" that are subsequently utilized for tape cartridge removal, thereby adding an additional layer of data security. Embodiments of the present invention provide the capability to require user intervention to physically depress a lockable mechanism to push the tape cartridges loaded into the lockable deep slot storage cell back into a position that is accessible by tape gripper robotic fingers, such that without the user intervention, each lockable deep slot storage cell behaves like a one-way street.

Embodiments of the present invention recognize that once a tape cartridge is loaded into a lockable "air gapped" deep slot storage cell, it cannot be removed by tape library robotics without a coordinated action by a user to depress a locking mechanism to push the tape cartridge(s) to a front-side of the lockable "air gapped" deep slot storage cell utilizing a spring mechanism and pusher mechanism, thereby rendering the tape cartridge inaccessible and secure from hackers that could possibly hack into the tape library and attempt to mount the tape cartridges into a tape drive to access or modify the data.

Embodiments of the present invention recognize that this lockable mechanism preserves all the benefits of traditional tape media storage while adding more robust security and data protections that further insulate client data from malicious hackers and cyber-criminal activity. Additionally, embodiments of the presenting invention further recognize that utilizing lockable "air gapped" deep slot storage cells eliminate potential security concerns associated with transporting tape cartridges away from a tape library, such as transporting into a vault for long-term storage.

Implementation of such embodiments may take a variety of forms, and implementation details are discussed subsequently with reference to the Figures.

Referring now to various embodiments of the invention in more detail, FIG. 1 is a perspective view illustrating a data storage library suitable for providing tape library data protection, in accordance with at least one embodiment of the invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method includes identifying a lower calibration target of a column of an automated tape library and identifying an upper calibration target of the column. The method includes calculating at least one slot position between the upper calibration target and the lower calibration target. For at least some of the calculated slot positions, the method includes performing a check including identifying an actual slot position corresponding to the calculated slot position. The actual slot position is located by a robotic accessor. The method includes comparing the calculated slot position to the corresponding identified actual slot position and determining whether the calculated slot position is within a predefined range of the corresponding identified actual slot position. The method includes outputting a result of the determination.

In another general embodiment, a system includes a processor and logic integrated with the processor, executable by the processor, or integrated with and executable by the processor. The logic is configured to perform the foregoing method.

In another general embodiment, a computer program product includes one or more computer readable storage media, and program instructions collectively stored on the one or more computer readable storage media. The program instructions include program instructions to perform the foregoing method.

Figure 2:
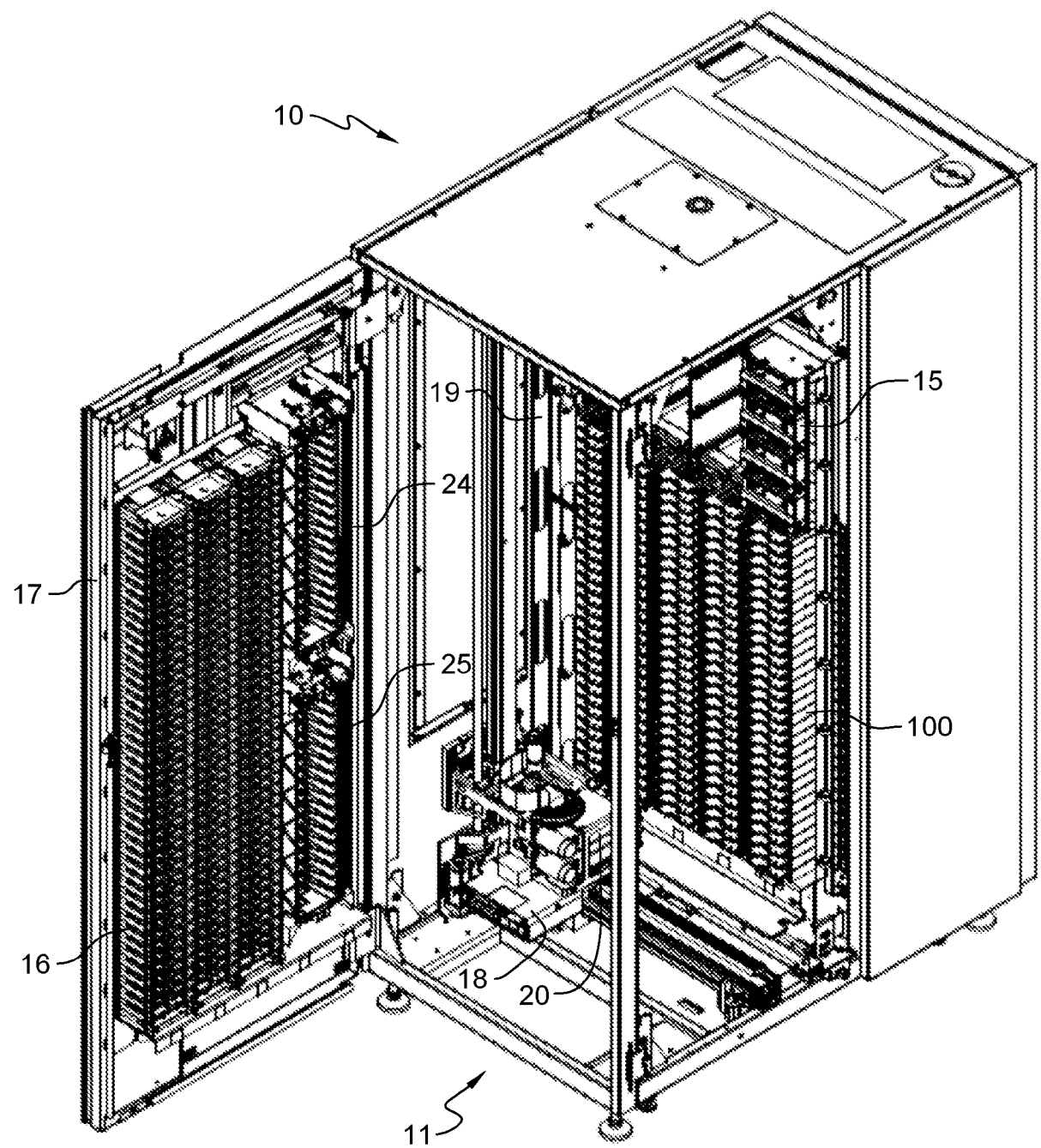
FIG. 2 illustrates a perspective view of a storage frame from the data storage library of FIG. 1, in accordance with an embodiment of the present invention.

FIGS. 1-2 illustrate a data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM® 3584 UltraScalable Tape Library (IBM and all IBM-based trademarks and logos are trademarks or registered trademarks of International Business Machines Corporation and/or its affiliates). Moreover, it should be noted that references to "data storage media" herein refer to data storage cartridges, and for purposes of the present application, the two terms may be used synonymously.

Data storage library 10 of FIG. 1 comprises a left-hand service bay 13, one or more storage frames 11, and right-hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an embodiment of a data storage frame 11, which acts as the base frame of data storage library 10. Moreover, data storage frame 11 illustrated in FIG. 2 is contemplated to be a minimum configuration of data storage library 10, for which there is only a single accessor, such as single accessor 18 (i.e., there are no redundant accessors) and no service bay. However, in other embodiments, a storage frame may include multiple robotic accessors and/or service bays.

Looking to FIG. 2, data storage library 10 is arranged for accessing data storage media in response to commands from at least one external host system (not shown). Data storage library 10 includes a plurality of storage slots, such as single cartridge storage slots 16 on front wall 17 and a plurality of multi-cartridge deep slot cells, such as multi-cartridge deep slot cells 100 on rear wall 19, both of which may be used for storing data storage cartridges that may contain data storage media. According to one approach, the single cartridge storage slots 16 are configured to store a single data storage cartridge, and multi-cartridge deep slot cells 100 are configured to store a plurality of data storage cartridges. In a preferred approach, the multi-cartridge deep slot cells may be arranged in sequential order of tiers from front to rear (e.g., see FIG. 6A and FIG. 7).

With continued reference to FIG. 2, data storage frame 11 of data storage library 10 also includes at least one data storage drive, such as data storage drive 15, e.g., for reading and/or writing data with respect to the data storage media. Additionally, single accessor 18 may be used to transport data storage media between single cartridge storage slots 16, multi-cartridge deep slot cells 100, and/or data storage drive 15. According to various approaches, data storage drives 15 may be optical disc drives, magnetic tape drives, solid state drives having nonvolatile random-access memory (NVRAM) such as Flash memory, or other types of data storage drives as are used to read and/or write data with respect to the data storage media.

As illustrated, the data storage frame 11 may optionally include an operator panel or other user interface, such as a web-based interface, which allows a user to interact with the library 10. The data storage frame 11 may also optionally comprise upper I/O station 24 and/or lower I/O station 25, thereby allowing data storage cartridges to be added (e.g., inserted) to the library inventory and/or removed from the library without disrupting library operation. Furthermore, data storage library 10 may have one or more data storage frames, such as data storage frames 11, each having single cartridge storage slots 16, multi-cartridge deep slot cells 100, and/or data storage drive 15, preferably accessible by single accessor 18.

As described above, data storage frame 11 may be configured with different components depending upon the intended function. One configuration of data storage frame 11 may comprise single cartridge storage slots 16, multi-cartridge deep slot cells 100, and/or data storage drive 15, and other optional components to store and retrieve data from the data storage cartridges. However, in another approach, data storage frame 11 may include single cartridge storage slots 16, multi-cartridge deep slot cells 100 and no other components. The single accessor 18 may have gripper assembly 20, e.g., for gripping one or more data storage media, in addition to having a bar code scanner or other reading system, such as a cartridge memory reader or similar system mounted on gripper assembly 20, to "read" identifying information about the data storage media.

FIG. 2 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 2 (and the other FIGS.) should be deemed to include any and all possible permutations.

Data storage library 10 as described in reference to FIGS. 1 and 2, is depicted according to one embodiment. According to the depicted embodiment, the data storage library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Data storage library 10 may have one or more data storage frames 11, left hand service bay 13 and right hand service bay 14. The left-hand service bay 13 may include a first accessor, where, as discussed above, single accessor 18 may include gripper assembly 20 and/or a bar code scanner (e.g., reading system) to "read" identifying information about the data storage media depending on the desired embodiment. Furthermore, right-hand service bay 14 may include a second accessor, which includes a second gripper assembly, and may also include a reading system to "read" identifying information about the data storage media (not shown).

According to one embodiment, in the event of a failure or other unavailability of the single accessor 18, or gripper assembly 20, etc., the second accessor may perform some or all the functions of single accessor 18. Thus, in different approaches, the two accessors may share one or more mechanical paths, they may have completely independent mechanical paths, or combinations thereof. In one example, the accessors may have a common horizontal rail with independent vertical rails to travel there along. Moreover, it should be noted that the accessors are described as first and second for descriptive purposes only and this description is not meant to limit either accessor to an association with either left-hand service bay 13, or right-hand service bay 14.

In an embodiment which is in no way intended to limit the invention, the first and second accessors may preferably move their grippers in at least two directions, called the horizontal "X" direction and vertical "Y" direction, e.g., to retrieve and grip, deliver and release, load and unload, etc.

the data storage cartridge at single cartridge storage slots 16, multi-cartridge deep slot cells 100, data storage drive 15, etc.

Data storage library 10 receives commands from one or more host systems (not shown). The host systems, such as host servers, communicate with data storage library 10 directly, e.g., on a path, through one or more control ports (not shown), or through one or more data storage drive 15 on paths. Thus, in different approaches, the host systems may provide commands to access particular data storage cartridges and move the cartridges, for example, between single cartridge storage slots 16 and data storage drive 15. The commands are typically logical commands identifying the cartridges or cartridge media, and/or logical locations for accessing the media. Furthermore, it should be noted that the terms "commands" and "work requests" are used interchangeably herein to refer to such communications from the host system to data storage library 10 as are intended to result in accessing particular data storage media within data storage library 10 depending on the desired approach.

According to one embodiment, data storage library 10 may be controlled by a library controller. Moreover, in various approaches, the library controller may include a distributed control system receiving the logical commands from hosts, determining the required actions, and/or converting the actions to physical movements of the first and/ or second accessor. In another approach, the distributed control system may have a plurality of processor nodes, each having one or more computer processors. According to one example of a distributed control system, a communication processor node may be located in data storage frame 11. The communication processor node provides a communication link for receiving the host commands, either directly or through the data storage drive 15, via at least one external interface, e.g., coupled to a line.

In one embodiment, a communication processor node may additionally provide a communication link for communicating with data storage drive 15. The communication processor node may preferably be located in data storage frame 11, e.g., close to data storage drive 15. Furthermore, one or more additional work processor nodes may be provided to form a distributed processor system, which may comprise, e.g., a work processor node located at first accessor, and that is coupled to the communication processor node via a network. According to different approaches, each work processor node may respond to received commands that are broadcast thereto from any communication processor node, and the work processor nodes may also direct the operation of the accessors, e.g., providing move commands. An XY processor node may be provided and may be located at an XY system of a first accessor. As illustrated, the XY processor node is coupled to the network, and is responsive to the move commands, operating the XY system to position gripper assembly 20.

Also, an operator panel processor node may be provided at an optional operator panel for providing an interface for communicating between the operator panel and the communication processor node, the work processor nodes, and the XY processor nodes.

A network, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA®, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node may be coupled to data storage drive 15 of data storage frame 11, via lines, and are thereby communicating with data storage drive 15 and with one or more host systems. Alternatively, the host systems may be directly coupled to the communication processor node, at an input for example, or to control port devices (not shown) which connect the library to the host system(s) with a library interface similar to the drive/library interface. As is known to those of skill in the art, various communication arrangements may be employed for communication with the hosts and with the data storage drives. In one example, host connections are intended to be Ethernet and a SCSI bus, respectively, e.g., and may serve as host connections. However, a bus may comprise an example of a Fibre Channel bus which is a high speed serial data interface, allowing transmission over greater distances than the SCSI bus systems.

According to some approaches, data storage drive 15 may be in close proximity to the communication processor node, and may employ a short distance communication scheme, such as Ethernet, or a serial connection, such as RS-422. Thus, data storage drive 15 may be individually coupled to the communication processor node by one or more lines. Alternatively, data storage drive 15 may be coupled to the communication processor node through one or more networks.

Furthermore, additional storage frames, such as data storage frame 11 may be provided, whereby each is preferably coupled to the adjacent storage frame. According to various approaches, any of the additional storage frames 11 may include communication processor nodes, single cartridge storage slots 16, data storage drive 15, multi-cartridge deep slot cells 100, and one or more networks, etc.

Moreover, as described above, data storage library 10 may comprise a plurality of accessors. A second accessor, for example, may be located in right-hand service bay 14 of FIG. 1. The second accessor may include a gripper assembly, such as gripper assembly 20, for accessing the data storage media, and an XY system for moving the second accessor. The second accessor may run on the same horizontal mechanical path as a first accessor, and/or on an adjacent (e.g., separate) path. Moreover a control system may additionally include an extension network, which forms an additional network coupled to a network of data storage frame 11 and to a network of left-hand service bay 13.

In one embodiment, the first and second accessors are associated with left-hand service bay 13 and right-hand service bay 14 respectively. However, this is for illustrative purposes and there may not be an actual association. Thus, according to another approach, a network may not be associated with left-hand service bay 13, and the network may not be associated with right-hand service bay 14. Moreover, depending on the design of data storage library 10, it may not be necessary to have left-hand service bay 13 and/or right-hand service bay 14 at all.

Data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 3:
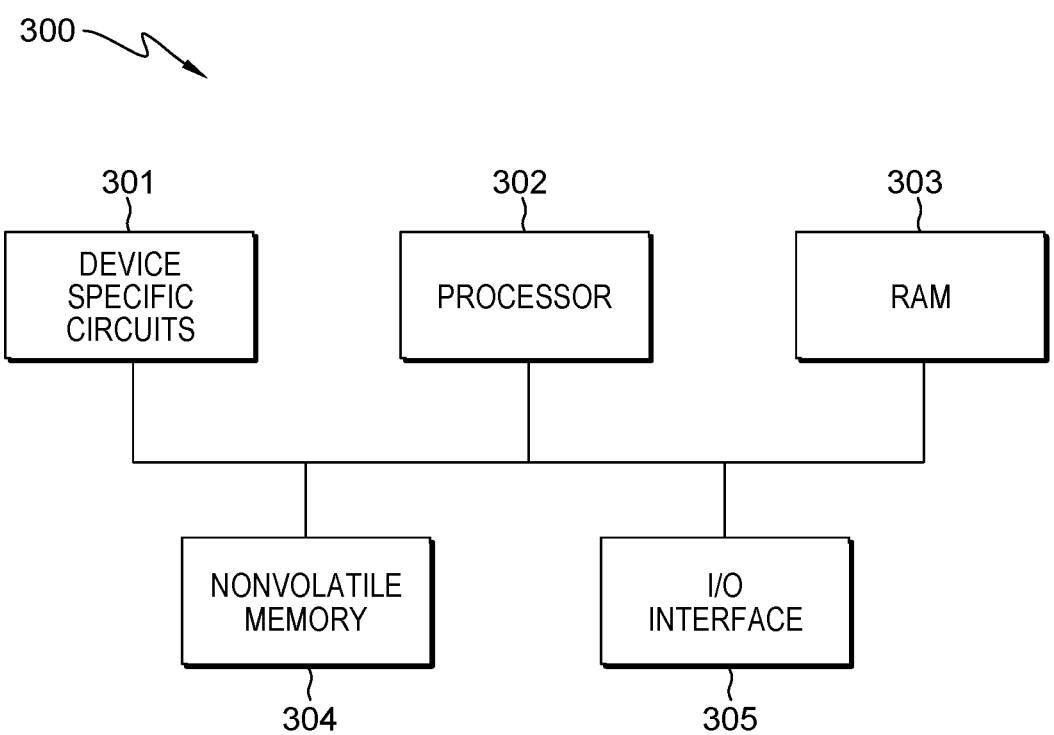
FIG. 3 illustrates a block diagram depicting a controller configuration for the data storage library of FIG. 1, in accordance with an embodiment of the present invention.

Referring now to FIG. 3, a typical controller 300 is shown with a processor 302, Random Access Memory (RAM) 303, nonvolatile memory 304, device specific circuits 301, and I/O interface 305. Alternatively, the RAM 303 and/or nonvolatile memory 304 may be contained in the processor 302 as could the device specific circuits 301 and I/O interface 305. The processor 302 may comprise, for example, an off-the-shelf microprocessor, custom processor, Field Programmable Gate Array (FPGA), Application Specific Integrated Circuit (ASIC), discrete logic, etc. The RAM 303 is typically used to hold variable data, stack data, executable instructions, etc.

According to various approaches, the nonvolatile memory 304 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 304 is typically used to hold the executable firmware and any nonvolatile data. Moreover, the I/O interface 305 comprises a communication interface that allows the processor 302 to communicate with devices external to the controller. Examples may comprise, but are not limited to, serial interfaces such as RS-232, USB (Universal Serial Bus) or Small Computer Systems Interface (SCSI). The device specific circuits 301 provide additional hardware to enable the controller 300 to perform unique functions including, but not limited to, motor control of a cartridge gripper. Moreover, the device specific circuits 301 may include electronics that provide, by way of example but not limitation, Pulse Width Modulation (PWM) control, Analog to Digital Conversion (ADC), Digital to Analog Conversion (DAC), etc. In addition, all or part of the device specific circuits 301 may reside outside the controller 300.

While data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, a communication processor node may comprise the library controller while the other processor nodes (if present) may assist the library controller and/or may provide backup or redundant functionality. In another example, communication processor node and work processor node may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 4A:
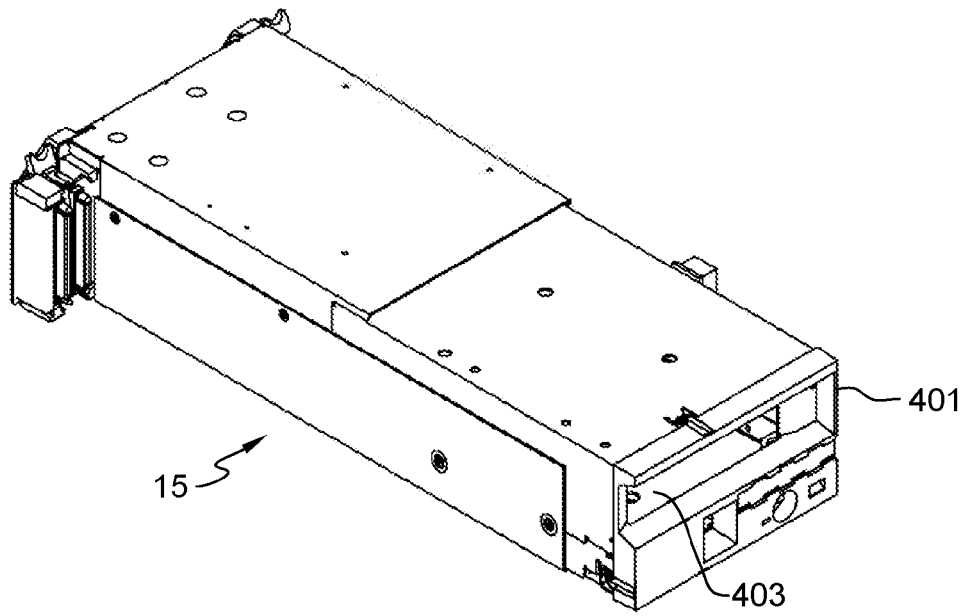
FIG. 4A illustrates a front perspective view of a data storage drive from the data storage library of FIG. 1, in accordance with an embodiment of the present invention.
Figure 4B:
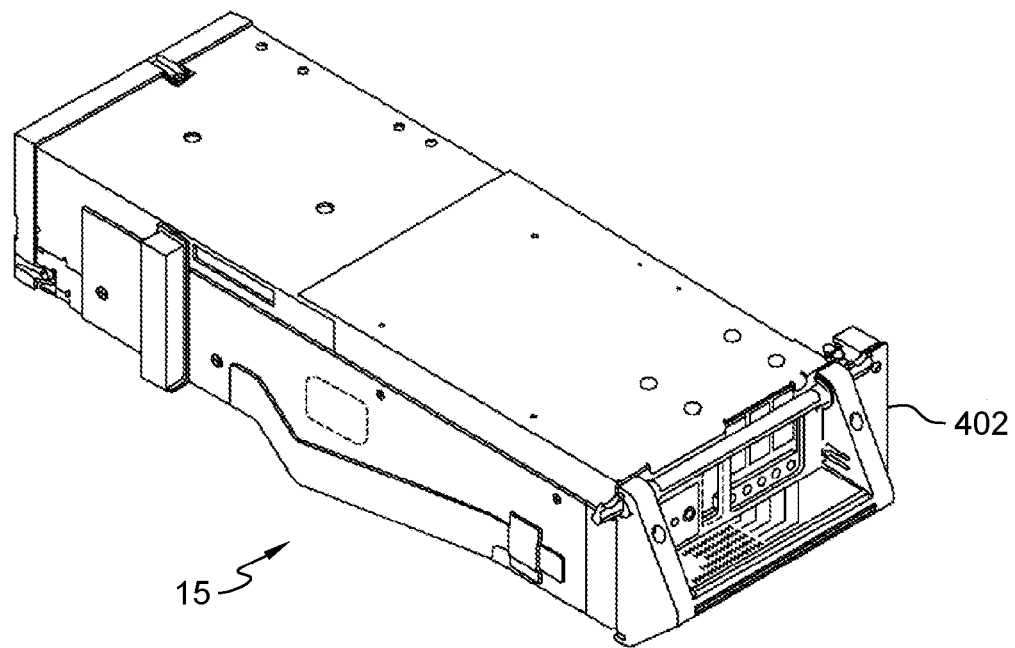
FIG. 4B illustrates a rear perspective view of the data storage drive of FIG. 4A, in accordance with an embodiment of the present invention.

FIGS. 4A and 4B illustrate the front 401 and rear 402 views of data storage drive 15, according to one embodiment. In the example depicted in FIGS. 4A and 4B, data storage drive 15 comprises a hot-swap drive canister, which is in no way intended to limit the invention. In fact, any configuration of data storage drive may be used whether or not it includes a hot-swap canister. As discussed above, data storage drive 15 is used to read and/or write data with respect to the data storage media, and may additionally communicate with a memory which is separate from the media, and is located within the cartridge. Thus, according to one approach, a data storage cartridge may be placed into data storage drive 15 at opening 403.

Figure 5:
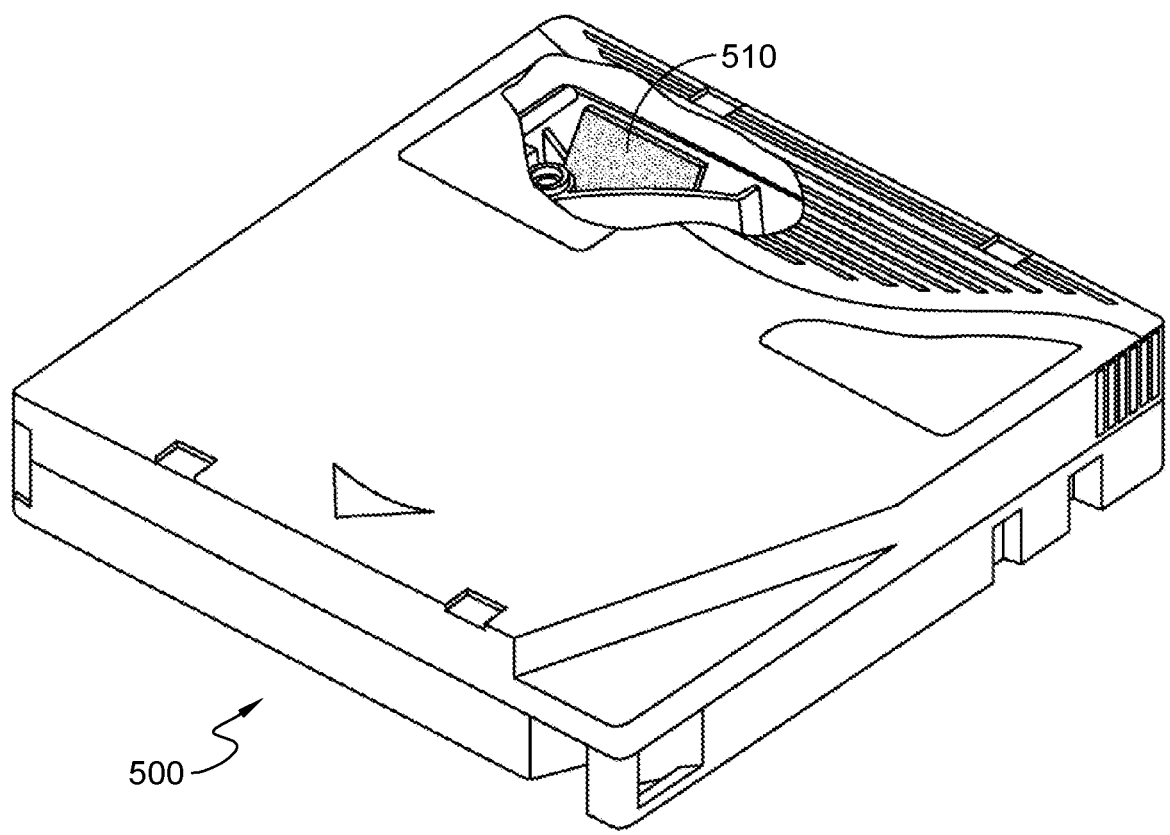
FIG. 5 illustrates a perspective view of a data storage cartridge from the data storage library of FIG. 1, in accordance with an embodiment of the present invention.

Furthermore, FIG. 5 illustrates an embodiment of a data storage cartridge, such as data storage cartridge 500, with a cartridge memory 510 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick®, etc.; etc., or other suitable media. Moreover, an example of a data storage cartridge that is widely employed in automated data storage libraries for mass data storage is a magnetic tape cartridge in which the media is magnetic tape.

Figure 6A:
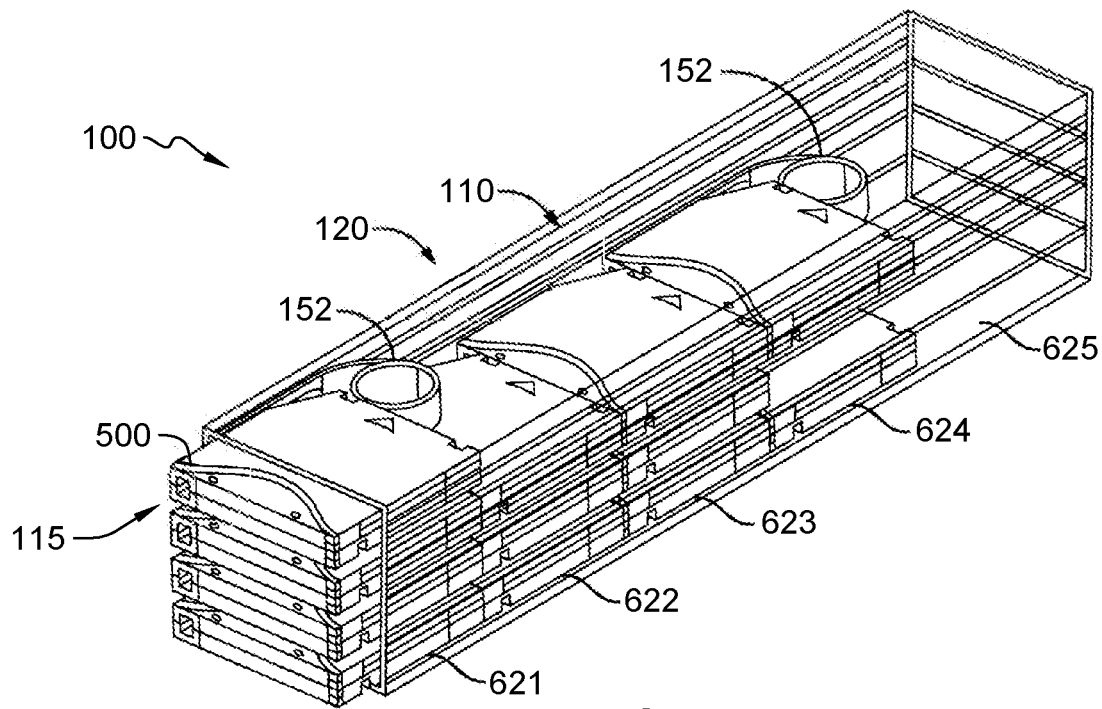
FIGS. 6A and 6B illustrate perspective views of a multi-cartridge deep slot cell from the data storage library of FIG. 1, in accordance with an embodiment of the present invention.
Figure 6B:
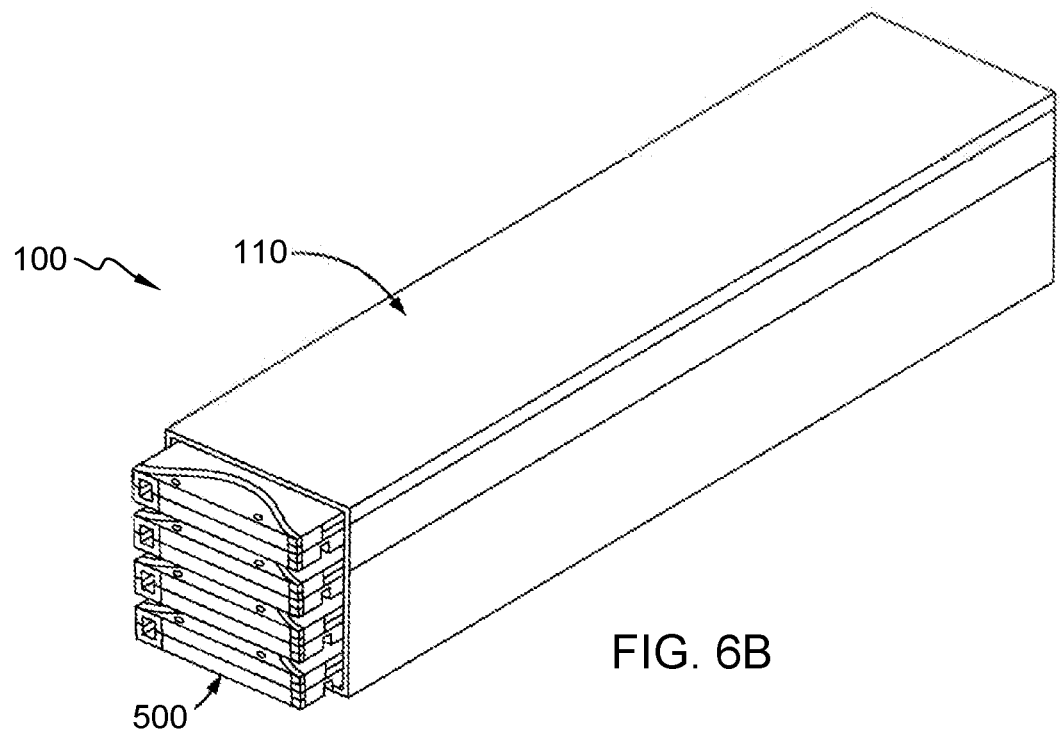

FIGS. 6A and 6B illustrate multi-cartridge deep slot cell 100 having biasing springs 152, as depicted according to one embodiment. As shown in the illustrative embodiment, multi-cartridge deep slot cell 100 comprises housing 110 defining an interior space 115. Furthermore, a plurality of storage slots 120 is disposed within the housing and may be configured for storing up to a plurality of data storage cartridges 500, depending on the desired approach. Alternatively, multi-cartridge deep slot cell 100 may be built into the frame of the automated data storage library according to one approach.

Referring to FIGS. 6A and 6B, in accordance with one embodiment, storage slots 120 are depicted as being configured for storing up to a plurality of data storage cartridges 500, and arranged in sequential order of tier 621, tier 622, tier 623, tier 624, and tier 625 from front to rear. It should be noted that the frontmost tier 621 is also called "tier 1", while the next tier 622 is called "tier 2", etc., and the last tier 625 is also called "tier 5", or the "rearmost" tier. However, referring to FIG. 2, in one embodiment, single cartridge storage slots 16 are also termed "tier 0". In one embodiment, multi-cartridge deep slot cell 100 is a high-density storage slot within a tape library frame, such as data storage frame 11, capable of storing up to five tape cartridges (5x), such as data storage cartridge 500, stacked in a row within a single slot space within the tape library frame. For example, multi-cartridge deep slot cell 100 is a high density storage slot capable of storing up to five tape cartridges in a tiered orientation, with a tier 5 position on linear tape open (LTO) tape cartridges being a first tape cartridge loaded into the slot (rear-most tape cartridge on a depth side of a tape library frame), and a tier 1 position being a last tape cartridge loaded into the slot (forward-most tape cartridge on a front side of a tape library frame). Where a tier 5 position LTO tape cartridge is requested, the LTO tape cartridges forward of it (up to four cartridges), need to be removed in order to access the requested LTO tape cartridge. In alternative embodiments, multi-cartridge deep slot cell 100 is capable of storing up to four tape cartridges in a tiered orientation, with a tier 4 position on enterprise tape cartridges being a first tape cartridge loaded into the slot (rear-most tape cartridge), and a tier 1 position being a last tape cartridge loaded into the slot (forward-most tape cartridge). Where a tier 4 position enterprise tape cartridge is requested, the enterprise tape cartridges forward of it (up to three cartridges), need to be removed in order to access the requested enterprise tape cartridge. However, it should be appreciated that embodiments of the present invention may be practiced with tape library frames having any number of tiered positions within a storage slot.

In one embodiment, multi-cartridge deep slot cell 100 may include a cartridge blocking mechanism having a retaining gate that retains the data storage cartridges, such as data storage cartridge 500, in multi-cartridge deep slot cell 100 according to one embodiment. According to one approach, the retaining gate may be externally attached to multi-cartridge deep slot cell 100, relative to a front opening of multi-cartridge deep slot cell 100, whereby the retaining gate can be activated by an accessor, e.g., of data storage library 10. Moreover, the retaining gate allows for positive cartridge retention against the pressure of biasing springs 152 (see FIGS. 6A and 6B) and ensures that one or more data storage cartridges do not get pushed out of multi-cartridge deep slot cell 100 simultaneously, while allowing a pushing mechanism (not shown) of multi-cartridge deep slot cell 100 to continuously push data storage cartridge(s) to the opening in multi-cartridge deep slot cell 100. Thus, according to one approach, the accessor may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of multi-cartridge deep slot cell 100. For example, a retaining gate can be lifted by, for example, a gripper assembly, such as gripper assembly 20, or by a front storage cartridge for cartridge removal from/insertion into multi-cartridge deep slot cell 100. Specifically, retaining gate has a pivoting arm mounted on multi-cartridge deep slot cell 100 via a pivoting post that can be integral to a construction of multi-cartridge deep slot cell 100. The pivoting arm is located below a catch of retaining gate whereby a thrust force through data storage cartridge 500 caused by the pushing mechanism of multi-cartridge deep slot cell 100 causes the retaining gate to stay closed in a retaining position. Moreover, the retaining gate is preferably biased such that it closes in the downward direction over the front opening of multi-cartridge deep slot cell 100. This constant biasing may be achieved via gravity, or by implementing a spring force, e.g., attached to the retaining gate.

For removal of a front storage cartridge by a gripper assembly, such as gripper assembly 20, from multi-cartridge deep slot cell 100, the retaining gate must be lifted upward to a releasing position whereby a catch of the retaining gate is disengaged from the front storage cartridge. Once the retaining gate is lifted to the releasing position and the accessor is engaged with a data storage cartridge, such as data storage cartridge 500, the accessor can pull the storage cartridge out of multi-cartridge deep slot cell 100 and into a gripper assembly, such as gripper assembly 20, of the accessor without any interference of the retaining gate.

Once the front storage cartridge is extracted and subsequent data storage cartridges are retained from being pushed out of multi-cartridge deep slot cell 100, the retaining gate has successfully completed its cartridge retrieval process. When a gripper assembly, such as gripper assembly 20, begins to insert storage cartridge back into multi-cartridge deep slot cell 100, the retaining gate is lifted to its releasing position to allow storage cartridges through the front opening of multi-cartridge deep slot cell 100. A catch of the retaining gate interfaces with a rear portion of the storage cartridge, in particular a beveled surface of the catch, whereby the retaining gate is lifted to its releasing position due to the storage cartridge being pushed into multi-cartridge deep slot cell 100 by the gripper assembly, such as gripper assembly 20. In doing so, data storage cartridges are pushed deeper into multi-cartridge deep slot cell 100 by the first storage cartridge in multi-cartridge deep slot cell 100 by the gripper assembly, such as gripper assembly 20. Thus, gripper assembly 20 can provide a force greater than the thrust force antiparallel thereto, to overcome the directional biasing of the storage cartridges. Upon full insertion into multi-cartridge deep slot cell 100, the retaining gate moves to its retaining position to engage the storage cartridge.

Thus, looking to various embodiments presented herein, access to a storage slot may include the ability to remove a cartridge from a storage slot, the ability to place a cartridge into a storage slot, or combinations thereof.

According to an embodiment, the storage slots from top to bottom are considered to be in parallel and comprise the same tier. Moreover, the storage slots from front to back, in a particular row, are considered to be in series and comprise sequential tiers.

In one embodiment, one or more data storage cartridges may be added into data storage library 10, e.g., at an I/O station, whereby the controller of data storage library 10 may then operate single accessor 18 to transport the data storage cartridge(s) to a specific multi-cartridge deep slot cell 100 and place the data storage cartridge(s) therein. Similarly, the controller may operate single accessor 18 to selectively extract, place and transport data storage cartridges with respect to single cartridge storage slots 16, and/or transport inserted or added cartridge(s) to specific single cartridge storage slots 16.

Figure 7:
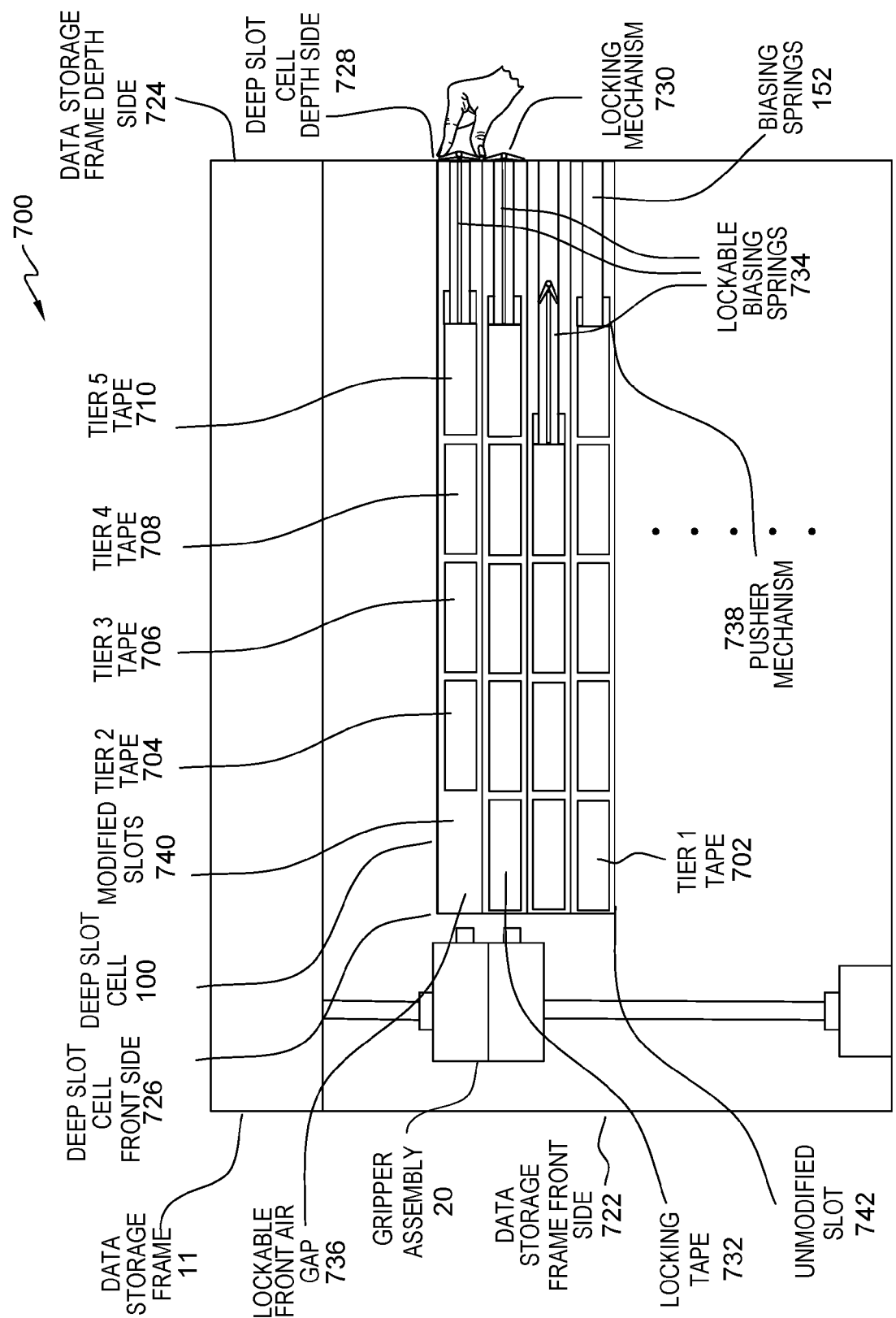
FIG. 7 illustrates a side perspective view of the data storage library of FIG. 1 including the multi-cartridge deep slot cell of FIGS. 6A and 6B with a lockable air gap feature, in accordance with an embodiment of the present invention.

FIG. 7 illustrates a side perspective view, generally designated 700, of data storage frame 11 including at least one multi-cartridge deep slot cell 100 having a lockable air gap feature and a tape gripper assembly, such as gripper assembly 20. In the illustrative embodiment, data storage frame 11 includes a plurality of high-density storage slots, such as multi-cartridge deep slot cell 100. In one embodiment, multi-cartridge deep slot cell 100 is oriented within data storage frame 11 such that deep slot cell front side 726 is facing data storage frame front side 722, and the deep slot cell depth side 728 is facing data storage frame depth side 724. For illustrative purposes, four deep slot cells are depicted in order to provide comparison between one unmodified deep slot cell to a set of three modified deep slot cells having a lockable air gap feature.

In one embodiment, the multi-cartridge deep slot cell, such as deep slot cell 100, includes a plurality of tape cartridges, such as tier 1 tape 702, tier 2 tape 704, tier 3 tape 706, tier 4 tape 708, and tier 5 tape 710, each stored in a tiered lateral layout orientation beginning with tier 1 tape 702 located in a tier 1 position, such as tier 621 of FIG. 6A, at deep slot cell front side 726 of deep slot cell 100, and ending with tier 5 tape 710 located in a tier 5 position, such as tier 625 of FIG. 6A, at deep slot cell depth side 728 of deep slot cell 100. A set of three modified deep slot cells having a lockable air gap feature includes a locking tape 732 located in a front-most position within deep slot cell 100, a position typically occupied by a tier 1 tape, such as tier 1 tape 702 as depicted in an unmodified deep slot cell.

In one embodiment, locking tape 732 is a tape cartridge capable of pushing one or more subsequent tape cartridges (i.e., a stack including tape cartridges located at a tier 2, a tier 3, a tier 4, and a tier 5 position, such as tier 1 tape 702, tier 2 tape 704, tier 3 tape 706, tier 4 tape 708, and tier 5 tape 710 located at tier 621, tier 622, tier 623, tier 624, and tier 625 of FIG. 6A, respectively) within a deep slot cell, such as deep slot cell 100, a sufficient distance from deep slot cell front side 726 inward toward deep slot cell depth side 728 to engage a locking mechanism, such as locking mechanism 730, with a rear portion of a housing of deep slot cell 100. In one embodiment, locking tape 732 is utilized to engage (e.g., hook, twist, latch, snap, etc.) a locking mechanism, such as locking mechanism 730, with a rear portion of a housing of deep slot cell 100. In one embodiment, locking tape 732 may be a cleaner tape cartridge, an empty regular tape cartridge, a tape cartridge storing data that does not need to be protected, a diagnostic tape cartridge, or another other tape cartridge of a size capable of pushing one or more subsequent tape cartridges within a deep slot cell a sufficient distance from a deep slot cell front side towards deep slot cell depth side 728 to engage a locking mechanism, such as locking mechanism 730, with a rear portion of a housing of the deep slot cell 100. In one embodiment, once locking tape 732 is inserted into deep slot cell 100, the locking mechanism, such as locking mechanism 730, is engaged with a rear portion of a housing of deep slot cell 100 (i.e., a "blocked" state), which locks a spring mechanism, such as biasing springs 152, and a pusher mechanism, such as pusher mechanism 738, to the rear portion of the housing of deep slot cell 100, rendering both inoperable and unable to advance one or more tape cartridges, such as tier 2 tape 704, tier 3 tape 706, tier 4 tape 708, and tier 5 tape 710 located at tier 622, tier 623, tier 624, and tier 625 of FIG. 6A, respectively. In one embodiment, although a locking tape cartridge, such as locking tape 732, can be removed by a tape library robotic mechanism, such as gripper assembly 20, when the locking mechanism, such as locking mechanism 730 is engaged with the rear portion of the housing of deep slot cell 100, any subsequent tape cartridges stored in a tier 2 position, a tier 3 position, a tier 4 position, and a tier 5 position, such as tier 2 tape 704, tier 3 tape 706, tier 4 tape 708, and tier 5 tape 710 located at tier 622, tier 623, tier 624, and tier 625 of FIG. 6A, respectively, cannot be removed from deep slot cell 100 by gripper assembly 20 without manual intervention to release locking mechanism 730. In one embodiment, when a locking tape cartridge, such as locking tape 732, is removed from deep slot cell 100 by a tape library robotic mechanism, such as gripper assembly 20, and the locking mechanism, such as locking mechanism 730 is engaged with the rear portion of the housing of deep slot cell 100, removing locking tape 732 creates an air gap, such as lockable air gap 736, at deep slot cell front side 726 that prevents gripper assembly 20 from removing any subsequent tape cartridges stored in a tier 2 position, a tier 3 position, a tier 4 position, and a tier 5 position, such as tier 2 tape 704, tier 3 tape 706, tier 4 tape 708, and tier 5 tape 710 located at tier 622, tier 623, tier 624, and tier 625 of FIG. 6A, respectively.

A spring mechanism, such as biasing springs 152, is integrated into a pusher mechanism of deep slot cell 100, such as pusher mechanism 738, and together, biasing springs 152 and pusher mechanism 738 apply a spring tension force to a plurality of tape cartridges loaded within deep slot cell 100, such as tier 1 tape 702, tier 2 tape 704, tier 3 tape 706, tier 4 tape 708, and tier 5 tape 710, each stored at, for example, tier 621, tier 622, tier 623, tier 624, and tier 625 of FIG. 6, to move the plurality of tape cartridges forward in a lateral direction towards deep slot cell front side 726 for access by the tape library robotics of data storage frame 11, such as gripper assembly 20. In one embodiment, as illustrated in FIG. 7, an unmodified deep slot cell, such as unmodified slot 742, is shown, including a respective biasing springs 152 and pusher mechanism 738 to facilitate normal loading and unloading of a plurality of tape cartridges from the deep slot cell, such as deep slot cell 100. In one embodiment, as illustrated in FIG. 7, a three modified deep slot cells, such as modified slots 740, are shown, each including a respective lockable biasing springs 734, pusher mechanism 738, and locking mechanism 730 to enable a lockable air gap, such as lockable front air gap 736, to disable normal loading and unloading of a plurality of tape cartridges from the deep slot cell, such as deep slot cell 100.

It should be understood that although FIG. 7 depicts three modified multi-cartridge deep slot cells, such as modified slots 740, and an unmodified multi-cartridge deep slot cell, such as unmodified slot 742, for brevity, embodiments of the present invention may be similarly practiced in any combination of multi-cartridge deep slot cells within a data storage frame, up to a maximum physical capacity within a data storage frame. For example, a data storage frame may include only one modified multi-cartridge deep slot cell along with a plurality of unmodified multi-cartridge deep slot cells, all of the multi-cartridge deep slot cells may be modified, or any combination of the plurality of multi-cartridge deep slot cells may be modified.

In one embodiment, a multi-cartridge deep slot cell, such as deep slot cell 100, includes a physical modification within a housing of multi-cartridge deep slot cell 100 that provides robust data protection for each of a plurality of tape cartridges stored on deep slot cell depth side 728. In one embodiment, multi-cartridge deep slot cell 100 includes a physical modification integrated into a housing of multi-cartridge deep slot cell 100 that prevents tape library robotics, such as gripper assembly 20 of data storage library 10, from removing any tape cartridge, such as data storage cartridge 500, stored behind a lockable tape cartridge, such as locking tape 732, within deep slot cell 100 without coordinated manual assistance. In one embodiment, the physical modification within the housing of multi-cartridge deep slot cell 100 includes integrating a locking mechanism, such as locking mechanism 730, to at least the spring mechanism, such as lockable biasing springs 734, and/or the pusher mechanism, such as pusher mechanism 738, within the housing of deep slot cell 100. In an alternative embodiment, the physical modification within the housing of multi-cartridge deep slot cell 100 includes integrating a locking mechanism, such as locking mechanism 730, to at least the spring mechanism, such as biasing springs 152, and/or the pusher mechanism, such as pusher mechanism 738, within the housing of multi-cartridge deep slot cell 100 by mechanically attaching locking mechanism 730 to lockable biasing springs 734 and/or pusher mechanism 738. For example, locking mechanism 730 may be integrated with biasing springs 152, and/or pusher mechanism 738 by affixing locking mechanism 730 to lockable biasing springs 734, and/or pusher mechanism 738 using a mechanical fastener (e.g., nuts and bolts, screws, pins, rivets, or any other suitable mechanical fastener known in the art). In yet another embodiment, the physical modification within the housing of multi-cartridge deep slot cell 100 includes integrating a locking mechanism, such as locking mechanism 730, to at least the spring mechanism, such as lockable biasing springs 734, and/or the pusher mechanism, such as pusher mechanism 738, within the housing of multi-cartridge deep slot cell 100 by molding (e.g., plastic molding, composite molding, casting, etc.) locking mechanism 730 to a housing (e.g., structure) of pusher mechanism 738 during the manufacturing of pusher mechanism 738, such that locking mechanism 730 is fully integrated with pusher mechanism 738. In yet another embodiment, the physical modification within the housing of multi-cartridge deep slot cell 100 includes integrating a locking mechanism, such as locking mechanism 730, to at least the spring mechanism, such as lockable biasing springs 734, and/or the pusher mechanism, such as pusher mechanism 738, within the housing of multi-cartridge deep slot cell 100 by any combination of molding and/or mechanical attachment to sufficiently affix locking mechanism 730 to lockable biasing springs 734 and/or pusher mechanism 738.

In one embodiment, with the locking mechanism, such as locking mechanism 730, integrated with lockable biasing springs 734, and/or pusher mechanism 738 of multi-cartridge deep slot cell 100 and engaged with a rear portion of the housing of multi-cartridge deep lost cell 100 at deep slot cell depth side 728, a tape cartridge, such as tier 2 tape 704, located at a tier 2 position, such as tier 622 of FIG. 6A, in the front of multi-cartridge deep slot cell 100, such as deep slot cell front side 726 immediately behind the locking tape, such as locking tape 732, would not be capable of being successfully grabbed by a gripper assembly, such as gripper assembly 20, due to the creation of lockable front air gap 736. For example, a theoretically "hacked" library could attempt to grab the tape cartridge, but it would fail the move, and the fingers of the gripper assembly, such as gripper assembly 20, would not successfully latch onto the tape cartridge because with the locking mechanism engaged at the depth side of the deep slot cell, the spring mechanism and/or pusher mechanism of the deep slot cell would be rendered inoperable, creating a lockable front air gap at the front side of the deep slot cell that prevents the gripper assembly, such as gripper assembly 20, from successfully grabbing the tape cartridge.

In one embodiment, the locking mechanism, such as locking mechanism 730, integrated with lockable biasing springs 734, and/or pusher mechanism 738 of multi-cartridge deep slot cell 100 and engaged with a rear portion of the housing of multi-cartridge deep lost cell 100 at deep slot cell depth side 728, creates lockable front air gap 736 at deep slot cell front side 726 once a locking tape cartridge, such locking tape 732, is removed from deep slot cell 100. In one embodiment, lockable front air gap 736 provides an "air gap" within the housing of multi-cartridge deep slot cell 100 that prevents gripper assembly 20 from removing a plurality of tape cartridges, such as tier 2 tape 704, tier 3 tape 706, tier 4 tape 708, and tier 5 tape 710, each stored at, for example, tier 621, tier 622, tier 623, tier 624, and tier 625 of FIG. 6 within deep slot cell 100. In one embodiment, lockable front air gap 736 renders tier 2 tape 704, tier 3 tape 706, tier 4 tape 708, and tier 5 tape 71, each stored at, for example, tier 621, tier 622, tier 623, tier 624, and tier 625 of FIG. 6 inaccessible once loaded into deep slot cell 100 behind locking tape 732. In one embodiment, the distance of lockable front air gap 736 from deep slot cell front side 726 into the housing of multi-cartridge deep slot cell 100 is determined at least by a length of locking tape 732 and/or a length of locking mechanism 730.

For example, when a tape cartridge is loaded (i.e., stored within) a lockable air gapped deep slot cell, such as modified slots 740, additional coordinated user interaction is required to appropriately remove the tape cartridge from the lockable air gapped deep slot cell. In this example, where the tape cartridge is to be removed from an lockable air gapped deep slot cell, such as modified slots 740, a user operator would receive an alert from a host computer, locate the data storage frame, such as data storage frame 11, where the tape cartridge, such as tier 2 tape 704, is stored, open up a rear door of the data storage frame, locate the appropriate lockable air gapped deep slot cell from the back of the data storage frame and, by depressing the locking mechanism, such as locking mechanism 730, release the locking mechanism to automatically advance a rear-most tape cartridge, such as tier 5 tape 710 forward toward deep slot cell front side 726. In this example, with the locking mechanism, such as locking mechanism 730, released, lockable biasing springs 734 and pusher mechanism 738 hold the stack of tape cartridges in the lockable air gapped deep slot cell at deep slot cell front side 726 until the data storage frame, such as data storage frame 11, receives a command for a gripper assembly, such as gripper assembly 20, to locate to the lockable air gapped deep slot cell, such as deep slot cell 100 to grab the tape cartridge, such as tier 2 tape 704. In this example, with a user providing the action of depressing the locking mechanism, such as locking mechanism 730, to release the spring mechanism, such as lockable biasing springs 734, and advance the one or more tape cartridges, the operation is very secure against cyber-attacks, as the operation requires a coordinated effort between a local user operator and data storage library controls.

Further, geometry of existing deep slot cells does not allow for a tape cartridge to be removed from the rear of a data storage frame, such as data storage frame 11. For example, since tape cartridges will not physically fit out of the back side of the deep slot cell, rendering inoperable a spring mechanism of a deep slot cell, such as biasing springs 152 of multi-cartridge deep slot cell 100, utilizing a locking mechanism, such as locking mechanism 730, mitigates any threats of data loss or data theft by human interaction directly with the data storage frame.

In one embodiment, a locking mechanism, such as locking mechanism 730, is a simple physical locking mechanism, such as a spring-loaded toggle bolt, a snap catch latch, butterfly latch, or any other suitable locking mechanism known in the art, etc., that is capable of automatically depressing upon passing through a dimension of an aperture and/or access hole located at a depth side of a deep slot cell, such as deep slot cell depth side 728 of multi-cartridge deep slot cell 100. In one embodiment, locking mechanism 730 is engaged automatically when a locking tape cartridge, such as locking tape 732, is loaded into a deep slot cell, such as deep slot cell 100, as a front-most tape cartridge after a tier 2, a tier 3, a tier 4, and a tier 5 tape cartridge, such as tier 2 tape 704, tier 3 tape 706, tier 4 tape 708, and tier 5 tape 710, have been loaded into deep slot cell 100 by gripper assembly 20. For example, upon loading locking tape 732 into modified slots 740, lockable biasing springs 734 and pusher mechanism 738 of deep slot cell 100 are locked at a rear position inside deep slot cell 100 utilizing locking mechanism 73. In this example, gripper assembly 20 would not be capable of successfully grabbing tier 2 tape 704, tier 3 tape 706, tier 4 tape 708, and tier 5 tape 710, but could however remove locking tape 732.

In one embodiment, locking mechanism 730 may be a depressible locking mechanism capable of being automatically depressed upon being pressed through (e.g., entering) an aperture, opening, and/or access hole located at a depth side of a multi-cartridge deep slot cell, and extending into a lockable position upon clearing the aperture and/or access hole, locking out the spring mechanism and/or the pusher mechanism at a length sufficient to create an lockable front air gap at the front of the multi-cartridge deep slot cell, such as lockable front air gap 736 at deep slot cell front side 726 of multi-cartridge deep slot cell 100. In one embodiment, locking mechanism 730 may be a specifically designed locking mechanism that can attach to the rear of the housing of the deep slot cell, or capable of attaching to a rear door of the data storage frame. In one embodiment, locking mechanism 730 may be any conceivable type of locking mechanism, such as a depressible latch, a twisting lever, a hooking mechanism, a liftable latch, a spring-loaded quarter turn fastener, a sliding catch, a pivoting mechanism, a pressure activated latch, etc., capable of automatically engaging with a housing of a deep slot cell, such as deep slot cell 100, and capable of being disengaged from the housing of the deep slot cell manually via user interaction.

In one embodiment, as illustrated in FIG. 7, three modified deep cell slots, such as modified slots 740, are shown, each having a locking mechanism, such as locking mechanism 730, integrated with both biasing springs 152 and/or pusher mechanism 738 within a housing a deep slot cell, such as deep slot cell 100. Each of the three modified deep slot cells, such as modified slots 740, show a different state of operation including, but not limited to, a locked state with a locking tape cartridge, such as locking tape 732, removed from deep slot cell 100, where a user is beginning to disengage a locking mechanism, such as locking mechanism 730, a locked state with a locking tape cartridge, such as locking tape 732, loaded in a tier 1 position, such as tier 621 of FIG. 6A, and an unlocked state where a tape cartridge, such as tier 2 tape 704 is advanced forward by biasing springs 152 and pusher mechanism 738 into a tier 1 position, such as tier 621 of FIG. 6A for removal by a gripper assembly, such as gripper assembly 20. In one embodiment, locking mechanism 730 being affixed to lockable biasing springs 734 and/or pusher mechanism 738 and upon being engaged with a rear portion of a housing of deep slot cell 100 creates a lockable front air gap, such as lockable front air gap 736 within the housing of deep slot cell 100, where lockable front air gap 736 provides data protection to the one or more tape cartridges, such as tier 2 tape 704, tier 3 tape 706, tier 4 tape 708, and tier 5 tape 710, within deep slot cell 100 by preventing a gripper assembly, such as gripper assembly 20, from accessing the one or more tape cartridges.

In one embodiment, a number and location of lockable air gapped deep slot cells, such as modified slots 740, within a data storage frame, such as data storage frame 11, can vary based, at least in part, on requirements of a tape library customer. For example, as few as one, or as many as every deep slot cell in a data storage frame (i.e., a tape library frame) of a data storage library (i.e., a tape library) can be configured as a lockable air gapped deep slot cell by rendering inoperable a spring mechanism and/or pushing mechanism within the deep slot cell utilizing an integrated locking mechanism affixed to the spring mechanism and/or pushing mechanism. In one embodiment, a number of tape cartridges that can be stored in a lockable air gapped deep slot cell capable of storing, at most, five tape cartridges, can vary from a single tape cartridge up to four tape cartridges deep (i.e., four tape cartridge maximum in a high-density storage slot due to a lockable tape cartridge occupying a tier 1 position, which can be removed by a gripper assembly and therefore not protected). For example, where a deeper tape cartridge, such as tier 4 tape 708 located in, for example, tier 624 of FIG. 6A, needs to be removed from a lockable air gapped deep slot cell, such as modified slots 740, a human operator would need to depress a lockable mechanism, such as locking mechanism 730, to disengage the locking mechanism from the housing of deep slot cell 100 and permit release of the spring mechanism, such as lockable biasing springs 734 and/or the pusher mechanism, such as pusher mechanism 738, to automatically advance the stack of tape cartridges forward toward a front side of the deep slot cell, such as deep slot cell front side 726, for tape cartridge retrieval by a gripper assembly, such as gripper assembly 20, until a desired tape cartridge is retrieved.

In one embodiment, lockable air gapped deep slot cells provide a very secure way of storing data on a tape cartridge within a tape library, and lockable air gapped deep slot cells can be incorporated along with many traditional security measures of a tape library such as physical locking, electronic monitoring of door open/closes and physical inventory of cartridges, to provide the added benefit of eliminating any risks associated with malicious hacking into control of the tape library robotics to gain access tape cartridges located in the lockable air gapped deep slot cells.

Figure 8:
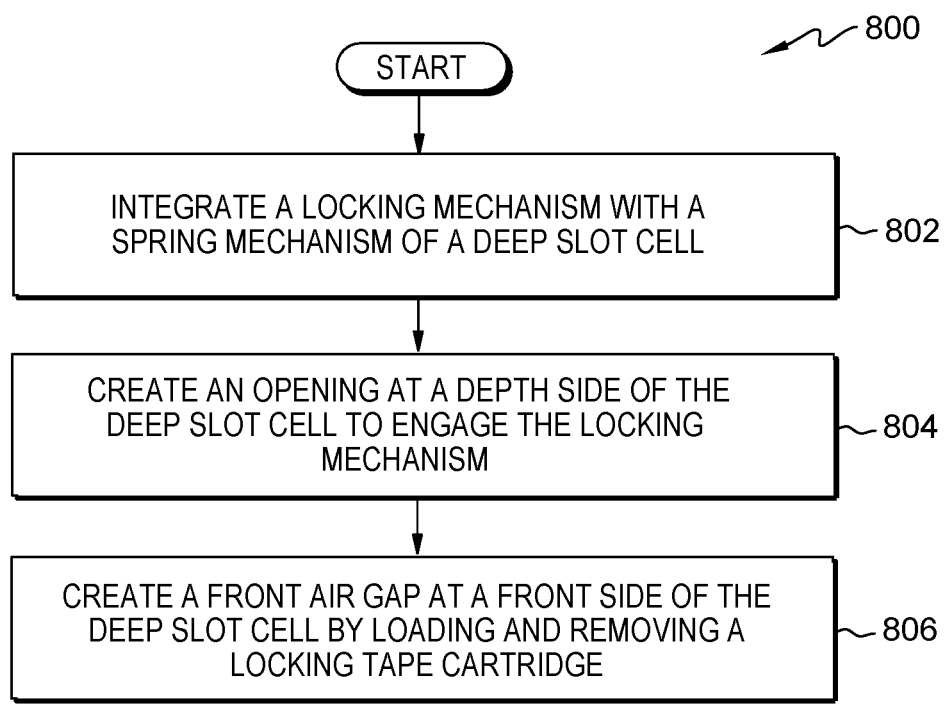
FIG. 8 illustrates a flowchart depicting steps for providing data storage protection, in accordance with an embodiment of the present invention.

FIG. 8 illustrates a flowchart, generally designated 800, depicting steps for providing data storage protection, in accordance with an embodiment of the present invention. In one embodiment, the method for providing data storage protection includes steps for modifying a deep slot cell, such as deep slot cell 100, wherein the steps for modifying the deep slot cell include integrating a locking mechanism with a spring mechanism of a deep slot cell (802), creating an opening at a depth side of the deep slot cell to engage the locking mechanism (804), and creating a front air gap at a front side of the deep slot cell by loading and removing a locking tape cartridge (806).

In one embodiment, integrating a locking mechanism with a spring mechanism of a deep slot cell (802) includes modifying the spring mechanism of a deep slot cell, such as biasing springs 152 of deep slot cell 100, to have the locking mechanism, such as locking mechanism 730, mechanically affixed to biasing springs 152. For example, the spring mechanism of a deep slot cell, such as biasing springs 152 of deep slot cell 100, may be modified to have the locking mechanism, such as locking mechanism 730, mechanically affixed to biasing springs 152, utilizing one or more mechanical fasteners, such as one or more screws, one or more nut and bolt combinations, one or more clips, and one or more rivets, etc., to securely attach the locking mechanism to the biasing spring mechanism, such that when the locking mechanism is engaged with an opening at a depth side of the deep slot cell, such as deep slot cell depth side 728, the locking mechanism prevents the biasing spring mechanism from apply a forward pressure to one or more tape cartridges, such as locking tape 732, tier 2 tape 704, tier 3 tape 706, tier 4 tape 708, and tier 5 tape 71, stored within the deep slot cell.

In one embodiment, creating an opening at a depth side of the deep slot cell to engage the locking mechanism (804) includes machining an aperture into the housing of the deep slot cell, such as deep slot cell 100. For example, creating the opening at the depth side of the deep slot cell, such as deep slot cell depth side 728, includes machining the aperture into the housing of the deep slot cell, such as deep slot cell 100, where the aperture is sized to accept the locking mechanism, such as locking mechanism 730, and where the aperture is configured to engage the locking mechanism with a portion of the housing of the deep slot cell automatically to prevent a biasing spring mechanism, such as biasing springs 152, from automatically advancing one or more tapes, such as tier 2 tape 704, tier 3 tape 706, tier 4 tape 708, and tier 5 tape 710, to a front side of the deep slot cell, such as deep slot cell front side 726, for removal by a gripper assembly, such as gripper assembly 20.

In one embodiment, creating a front air gap at a front side of the deep slot cell by loading and removing a locking tape cartridge (806) includes utilizing the locking tape cartridge, such as locking tape 732, to engage a locking mechanism, such as locking mechanism 730, upon being loaded into the deep slot cell, such as deep slot cell 100, and when removed from the deep slot cell, exposing a lockable front air gap, such as lockable front air gap 736, to isolate any stored one or more tape cartridges from a gripper assembly, such as gripper assembly 20. For example, creating a front air gap, such as lockable front air gap 736, at a front side of the deep slot cell, such as deep slot cell front side 726, includes loading a locking tape cartridge, such as locking tape 732, via a gripper assembly, such as gripper assembly 20, into the front side of the deep slot cell, such as deep slot cell front side 726, which causes a locking mechanism, such as locking mechanism 730, to engage with a portion of the housing of the deep slot cell, such as deep slot cell 100, automatically to prevent a biasing spring mechanism, such as biasing springs 152, from automatically advancing one or more tape cartridges, such as tier 2 tape 704, tier 3 tape 706, tier 4 tape 708, and tier 5 tape 710, to a front side of the deep slot cell, such as deep slot cell front side 726, and the removing the locking tape, such as locking tape 732, from the housing of the deep slot cell, such as deep slot cell 100, by a gripper assembly, such as gripper assembly 20, to expose lockable front air gap 736, where lockable front air gap 736 prevents gripper assembly 20 from reaching a front-most tape cartridge, such as tier 2 tape 704, as illustrated by modified slots 740 of FIG. 7.

Figure 9:
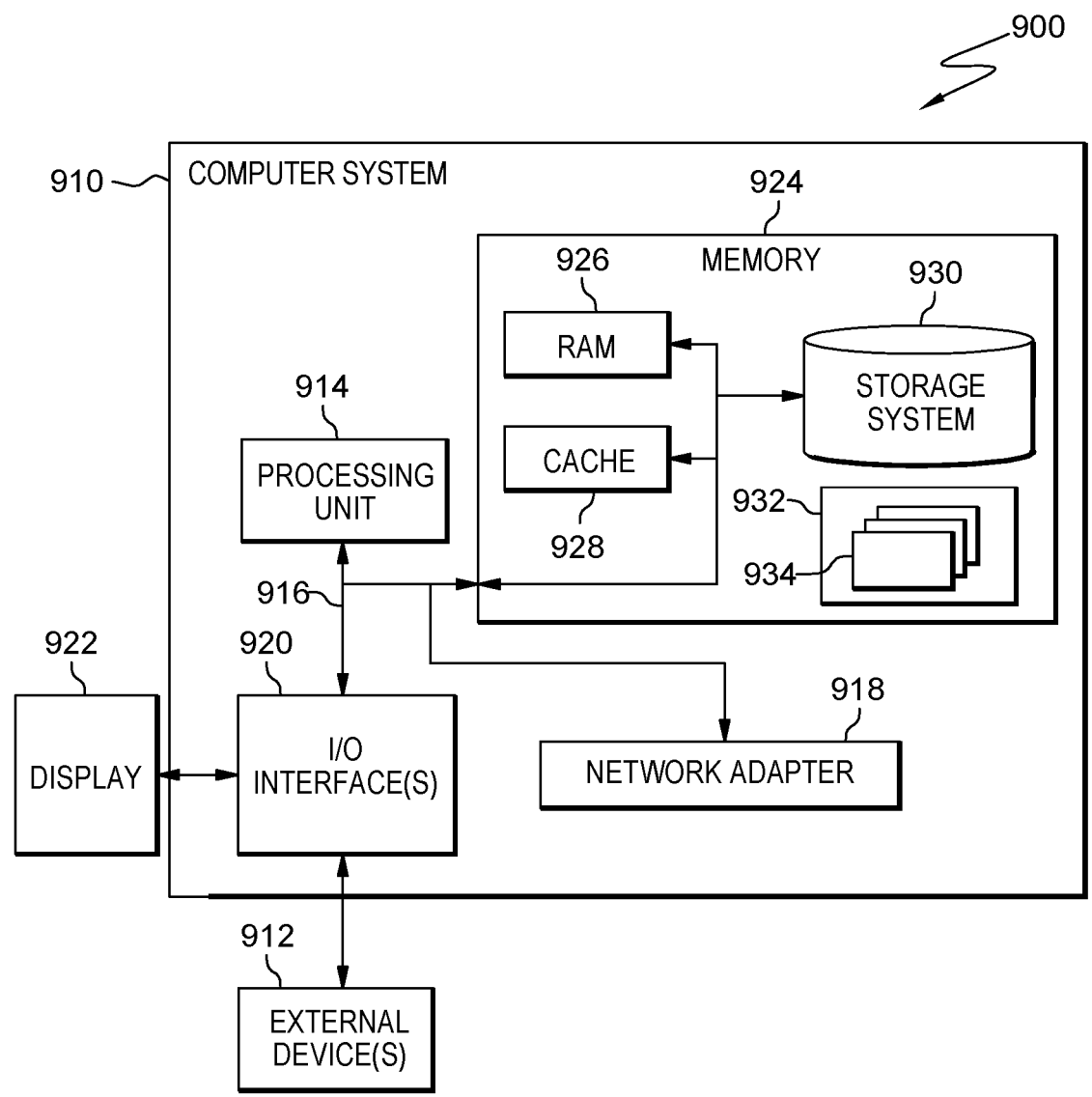
FIG. 9 illustrates a block diagram depicting components of a data processing system, in accordance with an embodiment of the present invention.

FIG. 9 is a block diagram, generally designated 900, depicting components of computing system, such as a server computer (e.g., host computer) interconnected with data storage library 10 of FIG. 1, generally designated 900, in accordance with an embodiment of the present invention. It should be appreciated that FIG. 9 provides only an illustration of one implementation and does not imply any limitations with regard to the environments in that different embodiments may be implemented. Many modifications to the depicted environment may be made.

In the illustrative embodiment, the host computer is shown in the form of a general-purpose computing device, such as computer system 910. The components of computer system 910 may include, but are not limited to, one or more processors or processing unit(s) 914, memory 924 and bus 916 that couples various system components including memory 924 to processing unit(s) 914.

Bus 916 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 910 typically includes a variety of computer system readable media. Such media may be any available media that is accessible by computer system 910 and it includes both volatile and non-volatile media, removable and non-removable media.

Memory 924 can include computer system readable media in the form of volatile memory, such as random-access memory (RAM) 926 and/or cache memory 928. Computer system 910 may further include other removable/non-removable, volatile/non-volatile computer system storage media. By way of example only, storage system 930 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 916 by one or more data media interfaces. As will be further depicted and described below, memory 924 may include at least one computer program product having a set (e.g., at least one) of program modules that are configured to carry out the functions of embodiments of the invention.

Program/utility 932, having one or more sets of program modules 934, may be stored in memory 924 by way of example and not limitation, as well as an operating system, one or more application programs, other program modules and program data. Each of the operating systems, one or more application programs, other program modules and program data or some combination thereof, may include an implementation of a networking environment. Program modules 934 generally carry out the functions and/or methodologies of embodiments of the invention as described herein. Computer system 910 may also communicate with one or more external device(s) 912, such as a keyboard, a pointing device, a display 922, etc. or one or more devices that enable a user to interact with computer system 910 and any devices (e.g., network card, modem, etc.) that enable computer system 910 to communicate with one or more other computing devices. Such communication can occur via Input/Output (I/O) interface(s) 920. Still yet, computer system 910 can communicate with one or more networks, such as a local area network (LAN), a general wide area network (WAN) and/or a public network (e.g., the Internet) via network adapter 918. As depicted, network adapter 918 communicates with the other components of computer system 910 via bus 916. It should be understood that although not shown, other hardware and software components, such as microcode, device drivers, redundant processing units, external disk drive arrays, RAID systems, tape drives and data archival storage systems may be used in conjunction with computer system 910.

The present invention may be a system, a method and/or a computer program product. The computer program product may include a computer readable storage medium (or media) having computer readable program instructions thereon for causing a processor to carry out aspects of the present invention. In one embodiment, the computer readable storage medium having computer readable program instructions thereon may be internal to a server computer. In another embodiment, the computer readable storage medium having computer readable program instructions thereon may be internal to a server computer. In other embodiments, the computer readable storage medium having computer readable program instructions thereon may be stored external to a server computer, such that a client computer communicates with the server computer through a network connection to execute the computer readable program instructions on data storage library 10.

In another embodiment, the computer readable storage medium having computer readable program instructions thereon may be internal to data storage library 10. In other embodiments, the computer readable storage medium having computer readable program instructions thereon may be stored external to data storage library 10, such that a server computer communicates with data storage library 10 through a network connection to execute the computer readable program instructions on data storage library 10.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. An apparatus for providing data storage protection, the apparatus comprising:
   a data storage library including a deep slot cell configured to house a plurality of tape cartridges, wherein the deep slot cell comprises:
      a front side of the deep slot cell configured to allow insertion and removal of a locking tape cartridge of the plurality of tape cartridges by a robotic mechanism;
      a depth side of the deep slot cell configured with an opening to engage a locking mechanism that prevents a biasing spring mechanism of the deep slot cell from automatically advancing a rear-most tape cartridge of the plurality of tape cartridges forward toward the front side of the deep slot cell; and
      a front air gap at the front side of the deep slot cell that prevents the robotic mechanism from reaching a front-most tape cartridge of the plurality of tape cartridges after the robotic mechanism removes the locking tape cartridge from the deep slot cell.

2. The apparatus of claim 1, wherein the deep slot cell is configured to include a biasing spring mechanism affixed to the locking mechanism from within a housing of the deep slot cell.

3. The apparatus of claim 1, wherein the deep slot cell is configured to include a pusher mechanism affixed to the locking mechanism from within a housing of the deep slot cell, wherein the pusher mechanism is a component of the deep slot cell that includes the biasing spring mechanism for automatically advancing forward the plurality of tape cartridges stored within the deep slot cell.

4. The apparatus of claim 1, wherein the robotic mechanism is a gripper assembly integrated within the data storage library.

5. The apparatus of claim 4, wherein the locking tape cartridge, responsive to being inserted by the gripper assembly into the front side of the deep slot cell, pushes each of the other tape cartridges of the plurality of tape cartridges rearward of the locking tape cartridge toward the depth side of the deep slot cell far enough to engage the locking mechanism with a portion of a housing of the deep slot cell after passing through the opening at the depth side of the deep slot cell.

6. The apparatus of claim 5, wherein a length of the front air gap of the deep slot cell from the front side of the deep slot cell into a housing of the deep slot cell is determined based, at least in part, on a dimension of the locking tape cartridge inserted into the deep slot cell by the gripper assembly and a length of the locking mechanism when engaged with the portion of the housing of the deep slot cell.

7. The apparatus of claim 1, wherein the locking mechanism is a depressible locking mechanism capable of being automatically depressed upon entering the opening at the depth side of the deep slot cell, and automatically extending into a lockable position upon clearing the opening at the depth side of the deep slot cell.

8. The apparatus of claim 1, wherein the locking mechanism is capable of being disengaged from a housing of the deep slot cell at the depth side of the deep slot cell manually via user interaction.

9. The apparatus of claim 1, wherein the locking mechanism, when disengaged from the depth side of the deep slot cell manually, permits the biasing spring mechanism to automatically advance the plurality of tape cartridges forward towards the front side of the deep slot cell to enable a gripper assembly to remove the front-most tape cartridge of the plurality of tape cartridges.

10. The apparatus of claim 1, wherein the locking tape cartridge is a tape cartridge storing data identified as not needing to be protected.

11. An apparatus for providing data storage protection, the apparatus comprising:
a data storage library including a deep slot cell configured to house a plurality of tape cartridges, wherein the deep slot cell comprises:
a front side of the deep slot cell configured to allow insertion and removal of a plurality of tape cartridges by a robotic mechanism;
the front side of the deep slot cell configured to allow insertion and removal of a locking tape cartridge of the plurality of tape cartridges by the robotic mechanism, wherein the locking tape cartridge being inserted by the robotic mechanism into the front side of the deep slot cell pushes each of the plurality of tape cartridges rearward of the locking tape cartridge toward a depth side of the deep slot cell;
the depth side of the deep slot cell configured with an opening to engage a locking mechanism, wherein the engaged locking mechanism renders a biasing spring mechanism of the deep slot cell inoperable;
a front air gap at the front side of the deep slot cell that prevents the robotic mechanism from reaching a front-most tape cartridge of the plurality of tape cartridges after the robotic assembly removes the locking tape cartridge from the deep slot cell; and
the locking mechanism configured to be disengaged from a housing of the deep slot cell at the depth side of the deep slot cell manually via user interaction.

12. An apparatus for providing data storage protection, the apparatus comprising:
a data storage library including a deep slot cell configured to house a plurality of tape cartridges, wherein the deep slot cell comprises:
a front side of the deep slot cell configured to allow insertion and removal of a plurality of tape cartridges by a robotic mechanism, wherein the robotic mechanism is a gripper assembly integrated within the data storage library;
the front side of the deep slot cell configured to allow insertion and removal of a locking tape cartridge of the plurality of tape cartridges by the robotic mechanism, wherein the locking tape cartridge being inserted by the gripper assembly into the front side of the deep slot cell pushes each of the plurality of tape cartridges rearward of the locking tape cartridge toward a depth side of the deep slot cell far enough to engage a locking mechanism with a portion of a housing of the deep slot cell after passing through an opening configured with the depth side of the deep slot cell;
the depth side of the deep slot cell configured with the opening to engage the locking mechanism, wherein the engaged locking mechanism prevents a biasing spring mechanism of the deep slot cell from automatically advancing a rear-most tape cartridge of the plurality of tape cartridges forward toward the front side of the deep slot cell;
a front air gap at the front side of the deep slot cell that prevents the robotic mechanism from reaching a front-most tape cartridge of the plurality of tape cartridges after the gripper assembly removes the locking tape cartridge from the deep slot cell; and
the locking mechanism configured to be disengaged from the housing of the deep slot cell at the depth side of the deep slot cell manually via user interaction, wherein the locking mechanism is a depressible locking mechanism.

13. A method for providing data storage protection, the method comprising:
modifying a deep slot cell configured to house a plurality of tape cartridges, wherein modifying the deep slot cell comprises:
integrating a locking mechanism with a biasing spring mechanism of the deep slot cell;
creating an opening at a depth side of the deep slot cell to engage the locking mechanism; and
creating a front air gap at a front side of the deep slot cell that prevents a robotic mechanism from reaching a front-most tape cartridge of the plurality of tape cartridges by loading and removing a locking tape cartridge.

14. The method of claim 13, wherein modifying the deep slot cell further comprises:
affixing the locking mechanism to the biasing spring mechanism mechanically within a housing of the deep slot cell.

15. The method of claim 13, wherein modifying the deep slot cell further comprises:
affixing the locking mechanism to a pusher mechanism mechanically within a housing of the deep slot cell, wherein the pusher mechanism is a component of the deep slot cell that includes the biasing spring mechanism for automatically advancing forward the plurality of tape cartridges stored within the deep slot cell.

16. The method of claim 13, wherein the robotic mechanism is a gripper assembly integrated within a data storage library.

17. The method of claim 13, further comprising:
inserting the locking tape cartridge into the front side of the deep slot cell to push each of the other tape cartridges of the plurality of tape cartridges rearward of the locking tape cartridge toward the depth side of the deep slot cell far enough to engage the locking mechanism with a portion of a housing of the deep slot cell after passing through the opening at the depth side of the deep slot cell.

18. The method of claim 13, further comprising:
determining a length of the front air gap of the deep slot cell from the front side of the deep slot cell into a housing of the deep slot cell based, at least in part, on a dimension of the locking tape cartridge inserted into the deep slot cell by a gripper assembly and a length of the locking mechanism when engaged with a portion of the housing of the deep slot cell.

19. The method of claim 13, further comprising:

disengaging the locking mechanism from the depth side of the deep slot cell manually, wherein disengaging the locking mechanism permits the biasing spring mechanism to automatically advance the plurality of tape cartridges forward towards the front side of the deep slot cell to enable a gripper assembly to remove the front-most tape cartridge of the plurality of tape cartridges.

20. The method of claim 13, wherein the locking mechanism is a depressible locking mechanism capable of being automatically depressed upon entering the opening at the depth side of the deep slot cell, and automatically extending into a lockable position upon clearing the opening at the depth side of the deep slot cell.

21. The method of claim 13, wherein the locking tape cartridge is a cleaner tape cartridge.

22. A computer system for tape library data protection, the computer system comprising:
one or more computer processors;
one or more computer readable storage media; and
program instructions stored on at least one of the one or more computer readable storage media for execution by at least one of the one or more computer processors, the stored program instructions comprising:
program instructions to modify a deep slot cell configured to house a plurality of tape cartridges, wherein the program instructions to modify the deep slot cell further comprise:
program instructions to integrate a locking mechanism with a biasing spring mechanism of the deep slot cell;
program instructions to create an opening at a depth side of the deep slot cell to engage the locking mechanism; and
program instructions to create a front air gap at a front side of the deep slot cell that prevents a robotic mechanism from reaching a front-most tape cartridge of the plurality of tape cartridges by loading and removing a locking tape cartridge.

23. The computer system of claim 22, further comprising:
program instructions to insert the locking tape cartridge into the front side of the deep slot cell to push each of the other tape cartridges of the plurality of tape cartridges rearward of the locking tape cartridge toward the depth side of the deep slot cell far enough to engage the locking mechanism with a portion of a housing of the deep slot cell after passing through the opening configured with the depth side of the deep slot cell.

24. The computer system of claim 22, further comprising:
program instructions to determine a length of the front air gap of the deep slot cell from the front side of the deep slot cell into a housing of the deep slot cell based, at least in part, on a dimension of the locking tape cartridge inserted into the deep slot cell by a gripper assembly and a length of the locking mechanism when engaged with a portion of the housing of the deep slot cell.

25. The computer system of claim 22, further comprising:
program instructions to disengage the locking mechanism from the depth side of the deep slot cell manually, wherein disengaging the locking mechanism permits the biasing spring mechanism to automatically advance the plurality of tape cartridges forward towards the front side of the deep slot cell to enable a gripper assembly to remove the front-most tape cartridge of the plurality of tape cartridges.

* * * * *